United States Patent [19]

Scapes et al.

[11] 4,284,100
[45] Aug. 18, 1981

[54] PIPE MOUNT MANIFOLD ASSEMBLY

[75] Inventors: John N. Scapes, Schaumburg; Joseph S. Soos, Hanover Park, both of Ill.

[73] Assignee: Gould Inc., Rolling Meadows, Ill.

[21] Appl. No.: 45,193

[22] Filed: Jun. 4, 1979

[51] Int. Cl.³ .............................. F16L 3/00; F16K 1/00
[52] U.S. Cl. .................................... 137/343; 137/884; 248/207
[58] Field of Search .............. 137/343, 884, 887, 886; 73/205 R; 248/71, 207, 558

[56] References Cited

U.S. PATENT DOCUMENTS

| 2,020,432 | 11/1935 | Parker | 73/205 R |
|---|---|---|---|
| 2,620,152 | 12/1952 | Niles | 248/207 |
| 2,871,881 | 2/1959 | Hewson | 137/886 |
| 3,596,680 | 8/1971 | Adams | 137/887 |
| 3,817,283 | 6/1974 | Hewson | 137/884 |
| 4,182,362 | 1/1980 | Hewson et al. | 137/343 |

Primary Examiner—Martin P. Schwadron
Assistant Examiner—A. Michael Chambers

[57] ABSTRACT

A pipe mount manifold assembly (10) including a valved manifold (11). The manifold is carried on a mounting bracket (23) having a carrier portion (34) to which the manifold may be secured in any one of a plurality of different positions by suitable securing devices (35). The mounting bracket (23) is adapted to be mounted to a pipe support (19,20,21) in any one of a plurality of different positions, and for this purpose, is provided with pairs of chocks (25,26) spaced apart in mutually perpendicular directions for cooperation with a securing clamp (30) in mounting the mounting bracket to the pipe in mutually perpendicular directions. The chocks include cleat portions (27) for biting into the pipe to provide a further improved positive mounting of the assembly to the pipe. Mounting bracket (23) may be formed as a one-piece element with the chocks and carrier portion defining turned flange portions thereof.

3 Claims, 5 Drawing Figures

PIPE MOUNT MANIFOLD ASSEMBLY

DESCRIPTION

1. Technical Field

This invention relates to valved manifold assemblies and in particular to such assemblies including means for mounting the valved manifold to a pipe or the like.

2. Background Art

In one form of process instrumentation valve system, a manifold bypass valve is provided having a transmitter. It has been conventional to mount the transmitter to a pipe or the like by a suitable bracket with the valved manifold being mounted to the transmitter for connection to the instrumentation ducts. This arrangement has presented a number of problems.

More specifically, such a system has required the provision of the transmitter in order to effect the conventional loop checkout of the system. Further, the provision of the transmitter has been required to permit the piping installation. Still further, such prior art systems present a problem in the maintenance of the transmitter as the removal of the transmitter for such maintenance has heretofore required disconnection of the process system ducts.

DISCLOSURE OF THE INVENTION

The present invention comprehends an improved pipe mount manifold assembly arranged to mount the valved manifold to the pipe support, permitting the transmitter to be mounted subsequently and independently of the connection of the system ducts to the manifold.

Thus, the present pipe mount manifold assembly permits the installation of the valved manifold to the process sensing line ducts without need for installation of the transmitter until loop check-out is desired.

The improved assembly of the present invention permits facilitated maintenance of the transmitter as it permits removal of the transmitter from the manifold without disturbing the process sensing line duct connections thereto.

The mounting bracket of the present invention provides a high versatility in the mounting of the manifold to the pipe in any one of at least eight different positions.

More specifically, the mounting bracket is adapted to mount the manifold suitably to horizontally extending pipe mounts and to vertically extending pipe mounts, as desired.

The mounting bracket may be utilized with manifolds having either pipe or flange-type connections to the system ducts.

The mounting bracket is provided with mounting chocks adapted to effectively positively engage the pipe to which the bracket is mounted for improved positive vibration-resistant mounting of the manifold.

The invention comprehends the provision of a protective plastic cap for covering the end of the pipe stand in pipe stand mounted installations.

The manifold mounting assembly of the present invention is extremely simple and economical of construction while yet providing an improved versatile vibration-resistant mounting of the manifold and transmitter.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
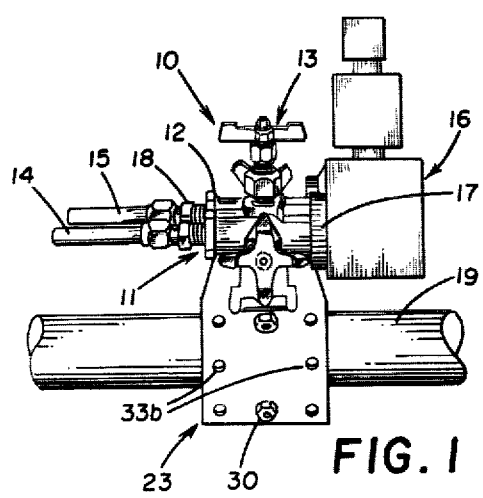
FIG. 1 is a perspective view of a pipe mount manifold assembly embodying the invention as installed on a horizontal run mounting pipe.
Figure 2:
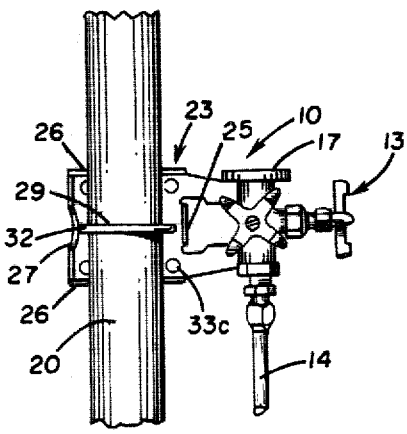
FIG. 2 is an elevation illustrating the use of the pipe mount manifold assembly in a vertical mounting pipe installation.
Figure 3:
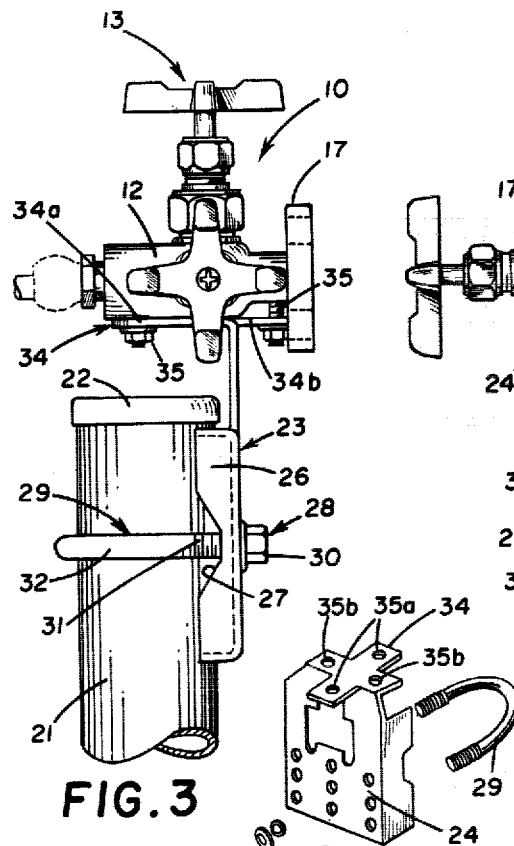
FIG. 3 is a side elevation illustrating the use of the pipe mount manifold assembly on a pipe stand mount.
Figure 4:
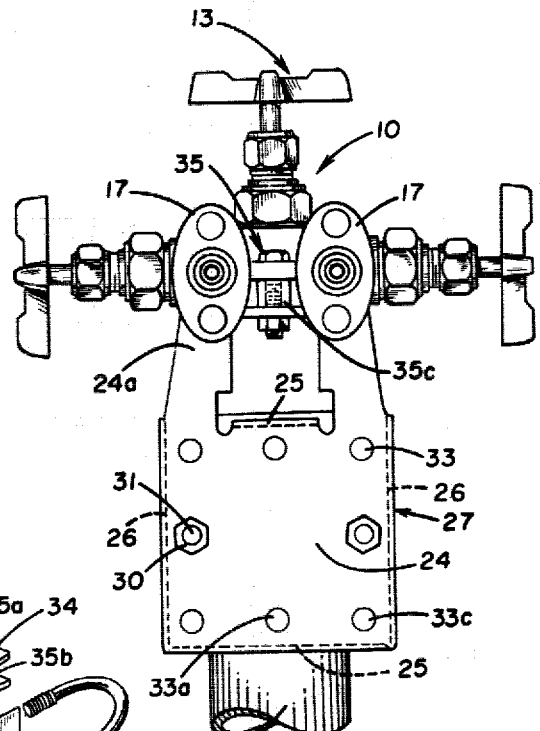
FIG. 4 is a front elevation thereof.

In the exemplary embodiment of the invention as disclosed in the drawing, a pipe mount manifold assembly generally designated 10 is illustrated in both vertical and horizontal mounting positions. Thus, as shown in FIG. 1, assembly 10 may be utilized in a horizontal pipe mount system; as shown in FIG. 2, the assembly 10 may be utilized in a vertical pipe mount system; and as shown in FIGS. 3 and 4, the assembly may be utilized in a pipe stand installation.

More specifically, the assembly 10 includes a valved manifold 11 having a body portion 12. One or more valves 13 may be carried by the body portion and in the illustrated embodiment, a plurality of valves 13 are provided for controlling fluid flow through the manifold relative to fluid in process sensing line ducts 14 and 15 connected to the manifold from a fluid system. The manifold further is arranged to carry a conventional transmitter 16. As shown in FIG. 1, the transmitter may be carried on a suitable flange 17 of the manifold, permitting facilitated installation and removal of the transmitter relative to the manifold when desired.

In the illustrated embodiment, the ducts 14 and 15 are connected to the manifold through conventional pipe connections 18, it being understood that the manifold may be equally advantageously provided with conventional flange connections as are well known to those skilled in the art.

In the illustrated embodiment, valves 13 are shown as manually operable valves, it being obvious to those skilled in the art that any suitable valve means may be utilized in conjunction with the manifold as desired within the scope of the invention. The invention, however, is advantageously employed in connection with the use of manually operable valves as shown in the drawing in that the improved assembly 10 permits facilitated installation so as to provide ready accessibility to the valves for manipulation thereof when desired with the manifold being mounted in any one of a substantial number of different positions relative to the mounting pipe.

As indicated briefly above, the invention comprehends a substantial improvement over the prior art structures in permitting the manifold to be mounted to the mounting pipe independently of the transmitter 16 so that the transmitter can be installed on the manifold subsequent to the installation of the manifold on the mounting pipe. Thus, in illustrating the invention as shown in FIGS. 2, 3 and 4, the transmitter is omitted to further illustrate this improved facility of use.

As further discussed above, the assembly 10 is adapted for use with mounting pipes which may extend in any direction, the invention being illustrated in connection with a horizontal pipe run 19 in FIG. 1, a vertical pipe run 20 in FIG. 2, and a vertical pipe stand 21 in FIGS. 3 and 4. As shown in FIG. 3, the invention comprehends the provision of a protective cap 22 which may be formed of a suitable synthetic resin or the like for covering the end of the pipe stand 21.

The manifold assembly includes an improved mounting bracket generally designated 23. Bracket 23 may be formed as a one-piece plate member defining a flat body portion 24 provided with a first set of turned flanges 25 defining a first pair of spaced chocks for mounting the bracket to a pipe, and a second set of turned flanges 26 arranged perpendicularly to flanges 25 so as to define a second set of chocks for mounting the bracket perpendicularly to the mounting arrangement where chocks 25 were used. The chocks may be provided with a recessed portion 27 defining a cleat portion adapted to bite into the pipe so as to provide an effectively positive mounting of the bracket to the pipe when the bracket is clamped thereto. The clamping means generally designated 28 may include a U-shaped element 29 illustratively comprising a U-bolt and suitable securing means generally designated 30 illustratively comprising nuts adapted to be threadedly secured to threaded ends 31 of the legs 32 of the U-bolt.

As best seen in FIG. 4, the mounting bracket base portion 24 is provided with a plurality of holes generally designated 33. The holes include a first pair 33a adapted to receive the threaded ends 31 of the U-bolt, and a second pair 33b (see FIG. 1) for similarly receiving the threaded ends 31 of the U-bolt. Additional corner holes 33c may be provided similarly to receive the threaded ends of the U-bolt in further varied dispositions as will be obvious to those skilled in the art.

Thus, the mounting bracket includes a first pair of openings 33b spaced perpendicular to the spacing direction of the first pair of chocks 25, and a second pair of openings 33a spaced perpendicularly to the spacing direction of the second pair of chocks 26. As will be obvious to those skilled in the art, the openings 33c define pairs of openings which may be utilized in spaced relationship in either direction relative to the chocks.

The mounting bracket further defines a carrier portion generally designated 34 to which body 12 of the manifold may be secured as by suitable threaded securing means, such as bolt 35, as best seen in FIGS. 3 and 4. A tubular spacer 35c may be utilized concentrically of the bolt to provide a stable mounting surface, if desired. The carrier portion may comprise a turned flange which includes both a rearward extending portion 34a and a forwardly extending portion 34b so as to permit the use of a plurality of threaded securing means 35 in effectively positively securing the manifold to the carrier portion. As best seen in FIGS. 1 and 4, the forwardly extending portion 34b may be formed from the upper portion 24a of the base plate portion 24 of the bracket, as seen in FIGS. 3 and 4. Thus, each of the chocks and carrier portion of the mounting brackets comprise edge flange portions thereof turned from the flat base portion 24 in the illustrated embodiment.

Figure 5:
FIG. 5 is an exploded perspective view of a mounting bracket and clamping means of the pipe mount manifold assembly.

In the illustrated embodiment, as shown in FIG. 5, the carrier portion 34 is generally cruciform shaped having a first pair of openings 35a spaced perpendicular to the flat plane of portion 24 and a second pair of openings 35b spaced parallel thereto. Thus, the manifold may be bolted to the carrier portion 34 so as to extend in either of perpendicular directions depending upon the selected bolt mounting holes.

Thus, the carrier portion defines means for supporting the manifold to the bracket in any one of a plurality of different positions and the bracket and clamp means effectively define means for mounting the bracket to the pipe support in any one of a plurality of different positions. Resultingly, the manifold may be mounted to the pipe in any one of at least eight different positions. Illustratively, the transmitter may be mounted to extend from the manifold parallel to the direction of the mounting pipe, as seen in FIGS. 1 and 2, or perpendicularly thereto, as seen in FIGS. 3 and 4.

Not only may the transmitter be readily installed and removed relative to the manifold, but the mounting bracket may be readily installed and removed relative to the pipe by the improved simplified clamping means as discussed above. The improved chock construction utilizing the cutout cleat portions 27 provides an effectively vibration-resistant, positive securing of the bracket to the pipe for further improved mounting of the manifold to the mounting pipe.

Thus, the present pipe mount manifold assembly 10 provides a substantial improvement over conventional manifold mounting brackets, such as the conventional simple L-shaped bracket utilized in the art for supporting the valved manifolds.

INDUSTRIAL APPLICABILITY

The pipe mount manifold assembly of the present invention may be utilized in a wide range of process instrumentation systems. The improved valved manifold mounting means provides for facilitated utilization of the apparatus and facilitates maintenance and stocking requirements.

The foregoing disclosure of specific embodiments is illustrative of the broad inventive concepts comprehended by the invention.

We claim:

1. A pipe mount manifold assembly (10) comprising:
  a valved manifold (11) having means (17) for mounting a transmitter (16) for process instrumentation thereto, and means (18) for connecting a fluid flow conduit (14,15) thereto;
  a mounting bracket (23) for supporting the manifold having a carrier portion (34) provided with securing means (35,35a,35b) for supporting the manifold in any one of a plurality of different positions thereon, a pipe mount portion having a flat plate portion (24), a first pair of turned flanges (25) formed at opposed sides of said plate portion and defining a first pair of chocks for mounting the bracket to a pipe with the carrier portion directed transversely to the spacing direction thereof, and a second pair of turned flanges (26) formed at opposed sides of said plate portion and defining a second pair of spaced chocks for mounting the bracket to a pipe with the carrier portion directed parallel to the spacing direction thereof, said pipe mount portion further having a plurality of openings in said flat plate portion within the area thereof defined by said flanges and including a first pair of openings (33b) spaced perpendicularly to the spacing direction of said first pair of flanges (25) and a second pair of openings (33a) spaced perpendicularly to the spacing direction of said second pair of flanges (26), said flanges (25,26) each further defining a cleat portion (27) for frictionally engaging a pipe to distribute the force of mounting said pipe mount portion to a pipe along at least two separated areas of said pipe mount portion and to positively position said mounting bracket in the desired mounting position with respect to a pipe;

a U-clamp (29) adapted to embrace a pipe and having legs (32) provided with distal ends (31) disposed to pass selectively through either of said pairs of openings; and securing means (30) adapted to be secured to said distal ends for cooperation with the U-clamp in clamping the bracket to the pipe with said carrier portion directed selectively parallel to or transversely to the pipe, whereby said manifold may be pipe mounted in any one of at least eight different positions.

2. The pipe mount manifold assembly of claim 1 wherein said U-clamp (29) comprises a U-bolt and said securing means comprise nuts (30) threaded to said distal ends (31) of the U-bolt legs.

3. The pipe mount manifold assembly of claim 1 wherein said carrier portion (34) comprises a cruciform plate portion.

* * * * *